J. N. KOPP.
ICE SAW.
APPLICATION FILED OCT. 7, 1909.

976,661.

Patented Nov. 22, 1910.

Witnesses
Frank R. Hon
H. C. Rodgers

Inventor
J. N. Kopp
By George Thorp Atty.

UNITED STATES PATENT OFFICE.

JOHN N. KOPP, OF LEAVENWORTH, KANSAS.

ICE-SAW.

976,661.  Specification of Letters Patent.  Patented Nov. 22, 1910.

Application filed October 7, 1909. Serial No. 521,621.

*To all whom it may concern:*

Be it known that I, JOHN N. KOPP, a citizen of the United States, residing at Leavenworth, in the county of Leavenworth and State of Kansas, have invented certain new and useful Improvements in Ice-Saws, of which the following is a specification.

This invention relates to ice saws and my object is to produce a saw provided with a pair of wedges, one at its point and the other adjacent to its handle and either capable of entering the kerf produced in a block or cake of ice by the blade for the purpose of quickly, easily and cleanly completing a division of a block of ice into two parts in the plane of the kerf.

A further object is to provide the blade with a wedge projecting forward to facilitate the separation of blocks of ice which have become frozen together through contact in a delivery wagon or other temporary storage receptacle.

A still further object is to produce a saw of the character outlined, of simple, strong, durable and cheap construction.

Figure 1:
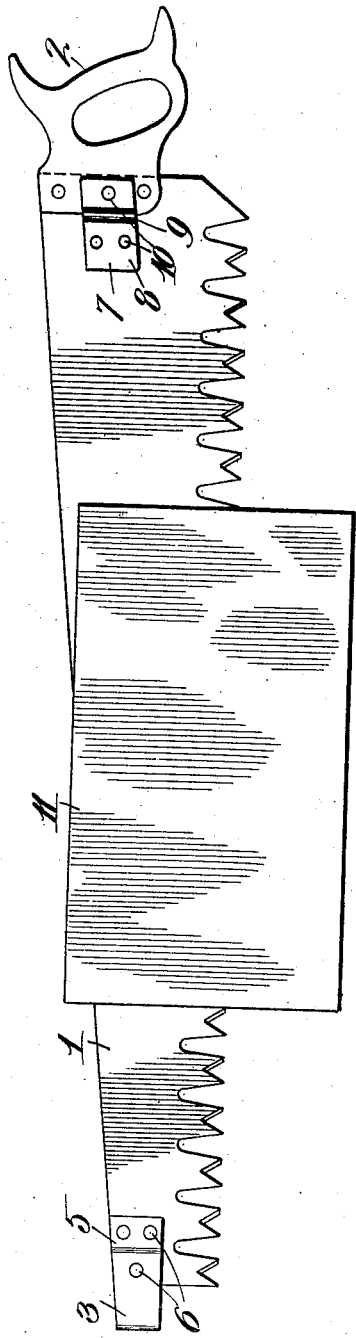
Figure 2:
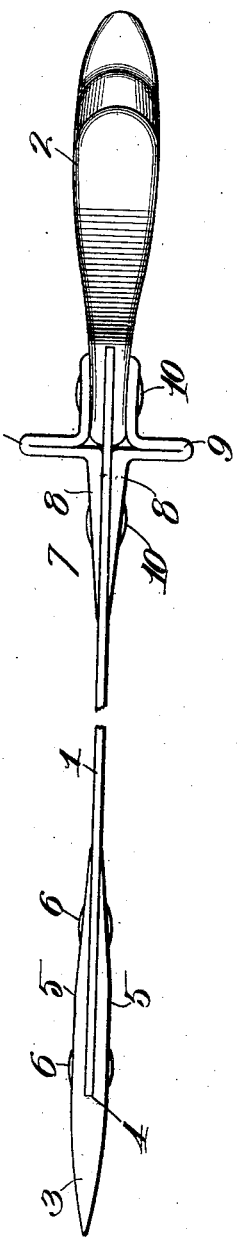

With these objects in view the invention consists in certain novel and peculiar features of construction and combinations of parts as hereinafter described and claimed; and in order that it may be fully understood reference is to be had to the accompanying drawing, in which:

Figure 1, is a side elevation of a saw embodying my invention, arranged in operative relation to a block of ice. Fig. 2, is an enlarged plan view of the saw, the blade of the saw being broken away at its middle.

In the said drawing, 1 indicates a saw of any suitable or preferred type capable of use for cutting blocks of ice, the saw being of that type provided with a handle at the butt or larger end, the handle being identified by reference character 2.

3 is a wedge of hard metal provided at its rear end with a vertical bifurcation 4, to snugly receive the tip or point of the saw and 5 indicates the arms produced by such bifurcation, said arms fitting flatly against opposite sides of the blade of the saw and tapering rearwardly at their outer sides to the planes of the opposite faces of the blade so as to conjointly constitute a rearwardly-facing wedge, rivets 6 being employed to secure the bifurcated wedge firmly in position.

Near its butt or handle end the saw is provided with a forwardly-projecting wedge 7, said wedge consisting of two hard metal strips 8 fitting flatly against opposite faces of the blade and having their outer faces tapering forward to the plane of the opposite faces of the blade. At the rear end of the wedge are outwardly-projecting guards 9 to protect the operator's hand from injury by contact with the ice at the moment that the splitting of a block is effected by the entrance of the wedge 7 in the kerf produced in a block of ice by the saw. The wedge 7, as shown is preferably composed of two strips of metal secured to the opposite sides of the blade and handle by rivets 10, the rearmost rivet being preferably one of the three rivets customarily employed in securing the blade in the handle.

The saw is used in the customary manner to produce a kerf in a block of ice identified by reference character 11, the strokes of the saw in producing such kerf being of such length that the wedges 5 and 7 shall not enter the kerf. When the kerf has attained a sufficient depth, the operator increases the length of the forward or rearward stroke of the saw so as to cause the rear wedge or the front wedge to forcibly enter the kerf and split the block into two pieces. In practice the relative positions of the operator and the block of ice will usually determine which wedge is employed for the purpose stated. For instance when the block of ice is in the wagon and the operator is standing upon the ground, it will usually be more convenient to increase the forward stroke of the saw and thus utilize the rear wedge to complete the severance of the block by splitting it. If the operator is sawing the block from a position above the same it will ordinarily be more convenient for him to increase the withdrawal or backward stroke of the saw and thus utilize the rearwardly-disposed wedge at the front end of the blade for splitting the block.

In loading ice in wagons, especially artificial ice, the blocks frequently freeze together and therefore cannot readily be separated. To perform this function the forwardly-projecting wedge 3 is employed, the same being inserted in the joint between the blocks of ice and forced forward, the blade being sufficiently stiff and rigid to permit of the easy and quick separation of the blocks in the manner explained.

Blocks of ice can be subdivided more quickly and cleanly and with less waste of ice or shrinkage with this wedge-equipped saw than by means of a pick or ax and with much less trouble and danger of injury to the operator.

From the above description it will be apparent that I have produced an ice saw embodying the features of advantage enumerated as desirable and susceptible of modification in minor particulars without departing from the spirit and scope or sacrificing any of the advantages of the appended claims.

Having thus described the invention what I claim as new and desire to secure by Letters-Patent, is:

1. An ice saw, provided at its front end and at opposite sides of the blade with a pair of rearwardly-disposed wedges to enter the kerf produced in a block of ice by the saw and split such block into two parts.

2. An ice saw, provided near its butt end with a forwardly-disposed wedge adapted to be forced forward into the kerf produced in a block of ice by the blade for splitting the block into two parts, and outwardly-projecting guards at the rear ends of the wedges.

3. An ice saw, comprising a blade having a handle at its butt end, and a pair of wedges at opposite ends of the blade, the wedge at the butt end of the blade facing forwardly and the wedge at the front end of the blade facing rearwardly, the forwardly facing wedge being equipped with outwardly-projecting guards.

In testimony whereof I affix my signature, in the presence of two witnesses.

JOHN N. KOPP.

Witnesses:
LOUIS H. WULFEKUHLER,
OTTO H. WULFEKUHLER.